(12) United States Patent
Weber et al.

(10) Patent No.: US 8,079,049 B2
(45) Date of Patent: Dec. 13, 2011

(54) SYSTEM AND METHOD FOR INSERTING SYNC BYTES INTO TRANSPORT PACKETS

(75) Inventors: Barry Jay Weber, Carmel, IN (US); Mark A. McCleary, Indianapolis, IN (US); Steven Ray True, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 693 days.

(21) Appl. No.: 11/823,072

(22) Filed: Jun. 26, 2007

(65) Prior Publication Data

US 2009/0007190 A1 Jan. 1, 2009

Related U.S. Application Data

(63) Continuation of application No. PCT/US2005/038750, filed on Oct. 26, 2005, now abandoned.

(51) Int. Cl.
  *H04N 7/20* (2006.01)
  *H04N 7/18* (2006.01)
  *H04L 12/28* (2006.01)
(52) U.S. Cl. ............... 725/71; 725/67; 725/78; 370/389
(58) Field of Classification Search ...................... 725/71
  See application file for complete search history.

(56) References Cited

U.S. PATENT DOCUMENTS

| | | | | |
|---|---|---|---|---|
| 5,970,386 | A | * | 10/1999 | Williams .......................... 725/69 |
| 6,134,419 | A | * | 10/2000 | Williams ........................ 725/151 |
| 6,691,311 | B1 | * | 2/2004 | Yata et al. ......................... 725/68 |
| 2004/0172658 | A1 | * | 9/2004 | Rakib et al. .................... 725/120 |
| 2006/0271966 | A1 | * | 11/2006 | Staal et al. ....................... 725/68 |
| 2007/0136765 | A1 | * | 6/2007 | Shah et al. ....................... 725/71 |
| 2008/0253466 | A1 | * | 10/2008 | Fu ............................ 375/240.26 |

FOREIGN PATENT DOCUMENTS

EP 1 117 214 7/2001

OTHER PUBLICATIONS

International Preliminary Report on Patentability Chapter I dated Apr. 29, 2008 in International counterpart Application No. PCT/US2005/038750 of corresponding U.S. Appl. No. 11/823,072, filed Jun. 26, 2007 by Weber et al.*
Search Report Dated Aug. 25, 2006.

* cited by examiner

*Primary Examiner* — Kristine Kincaid
*Assistant Examiner* — Christopher Parry
(74) *Attorney, Agent, or Firm* — Robert D. Shedd; Vincent E. Duffy

(57) ABSTRACT

The disclosed embodiments relate to a system and method for inserting sync bytes into a video transport stream. More specifically, there is provided a method comprising determining a parsing procedure supported by a first set top box, appending a first transport packet to comply with the parsing procedure of the first set top box, and transmitting the first transport packet to the first set top box.

12 Claims, 4 Drawing Sheets

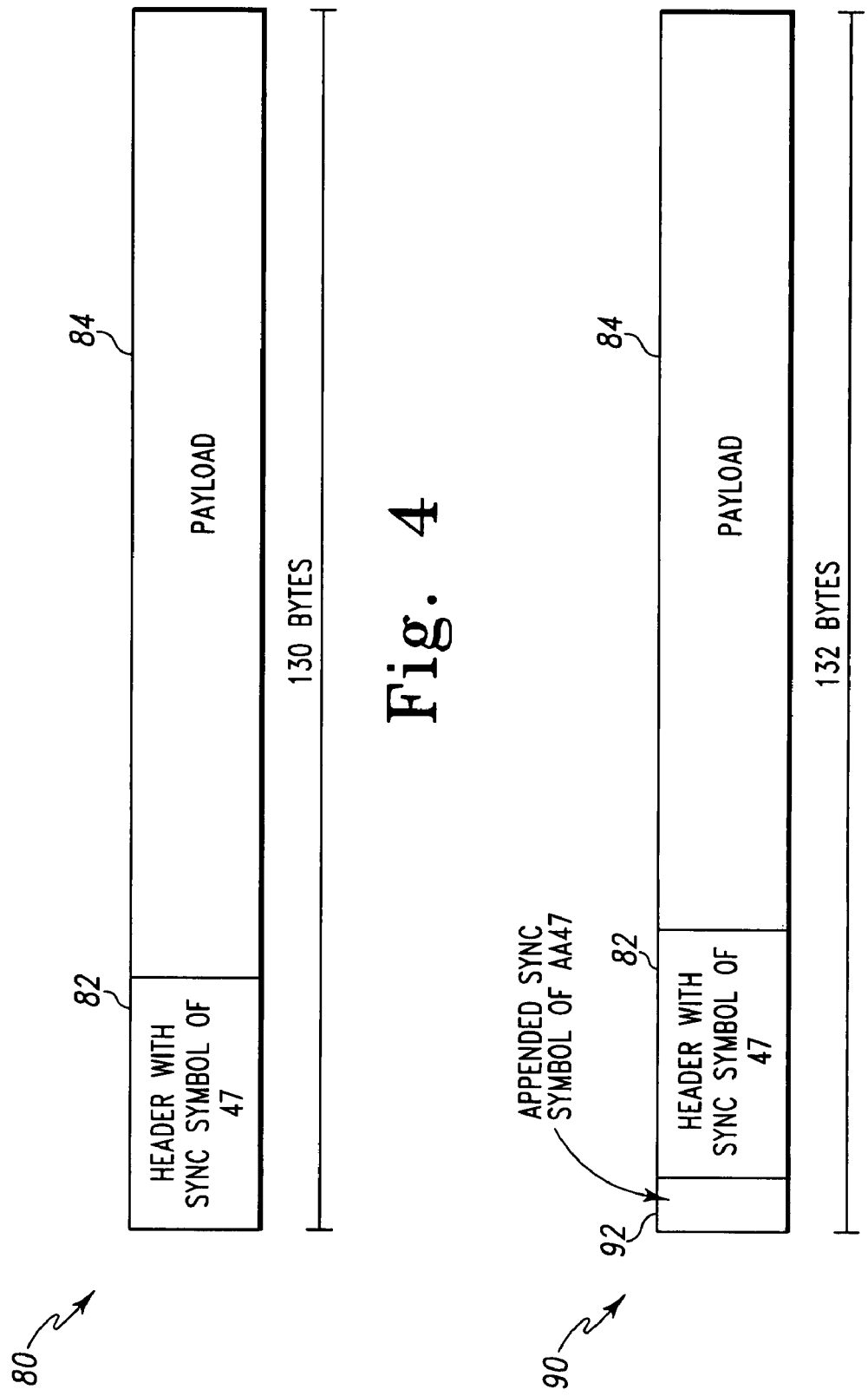

SYSTEM AND METHOD FOR INSERTING SYNC BYTES INTO TRANSPORT PACKETS

This application claims the benefit under 35 U.S.C. §365 and is a continuation of International Application PCT/US2005/038750, filed Oct. 26, 2005, now abandoned, which was published in accordance with PCT article 21(2) on May 3, 2007 in English.

FIELD OF THE INVENTION

The present invention relates generally to transmitting video or other digital data over a network. More specifically, the present invention relates to a system for inserting sync bytes into a video transport stream.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

As most people are aware, satellite television systems, such as DirecTV, have become much more widespread over the past few years. In fact, since the introduction of DirecTV in 1994, more than twelve million American homes have become satellite TV subscribers. Most of these subscribers live in single-family homes where satellite dishes are relatively easy to install and connect. For example, the satellite dish may be installed on the roof of the house.

Many potential subscribers, however, live or temporarily reside in multi-dwelling units ("MDUs"), such as hotels or high-rise apartment buildings. Unfortunately, there are additional challenges involved with providing satellite TV services to the individual dwelling units within an MDU. It may be impractical and/or extremely expensive to provide and connect one satellite dish per dwelling. For example, in a high-rise apartment building with one thousand apartments, it may be impractical to mount one thousand satellite dishes on the roof of the building. Some conventional systems have avoided these issues by converting the digital satellite television signal into an analog signal that can be transmitted via a single coaxial cable to a plurality of dwellings. These systems, however, offer limited channels, have reduced quality compared to all-digital systems, and cannot provide the satellite TV experience that users who live in single family homes are accustomed.

An improved system and/or method for providing satellite TV to a multi-dwelling unit is desirable.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for inserting sync bytes into a video transport stream. More specifically, there is provided a method comprising determining a parsing procedure supported by a first set top box (22a), appending a first transport packet to comply with the parsing procedure of the first set top box (22a), and transmitting the first transport packet to the first set top box (22a).

BRIEF DESCRIPTION OF THE DRAWINGS

Advantages of the invention may become apparent upon reading the following detailed description and upon reference to the drawings in which:

FIG. 4 is a block diagram of an exemplary transport packet of the present invention; and FIG. 5 is a block diagram of an exemplary appended transport packet in accordance with embodiments of the present invention.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
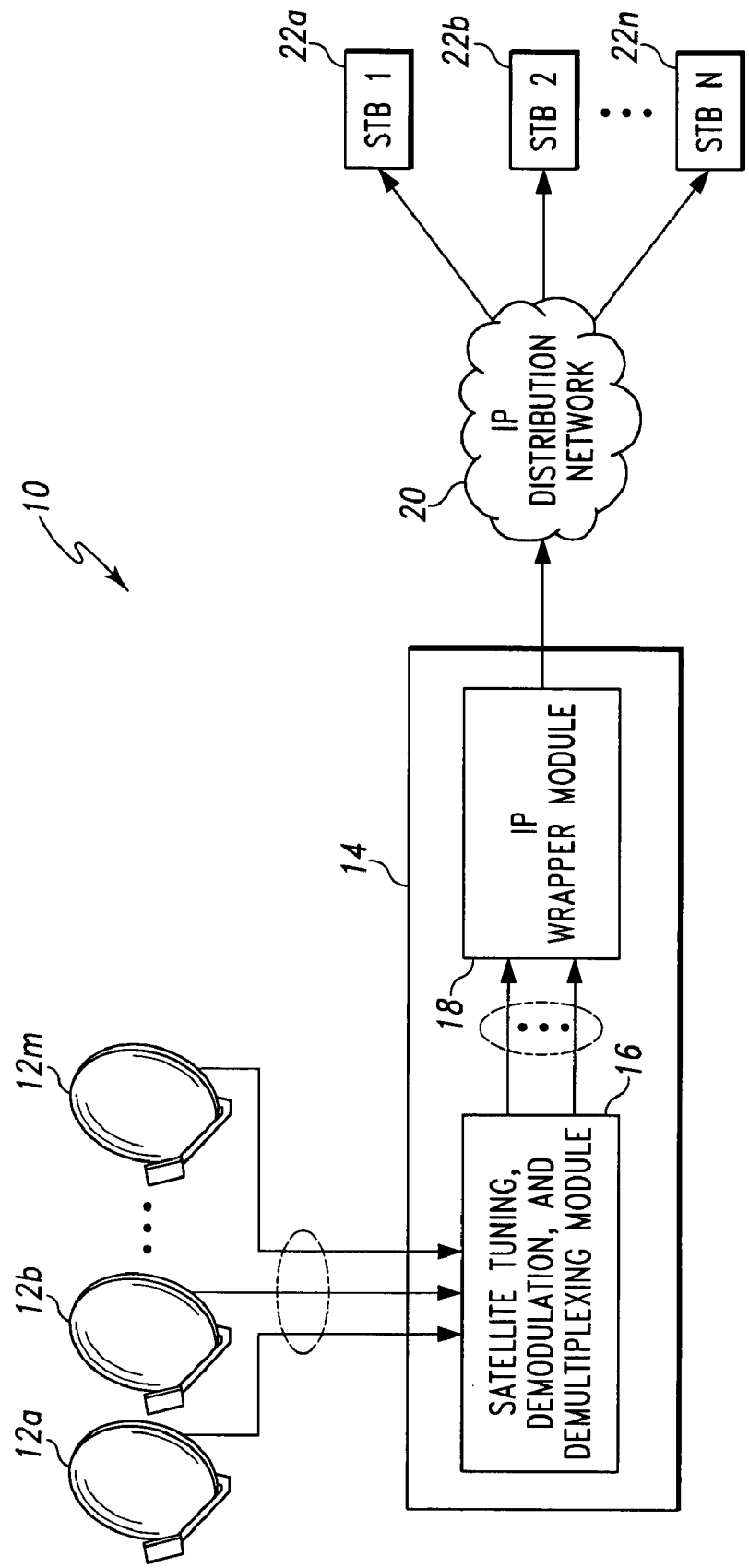
FIG. 1 is a block diagram of an exemplary satellite television over IP system in accordance with one embodiment of the present invention.

Turning to FIG. 1, a block diagram of an exemplary satellite television over IP system in accordance with one embodiment is illustrated and generally designated by a reference numeral 10. As illustrated, in one embodiment, the system 10 may include one or more satellite dishes 12a through 12m, a head-end unit, such as a satellite gateway 14, an IP distribution network 20, and one or more set top boxes ("STBs") 22a through 22n. Those of ordinary skill in the art, however, will appreciate that the embodiment of the system 10 illustrated in FIG. 1 is merely one potential embodiment of the system 10. As such, in alternate embodiments, the illustrated components of the system 10 may be rearranged or omitted or additional components may be added to the system 10. For example, with minor modifications, the system 10 may configured to distributed non-satellite video and audio services.

The satellite dishes 12a-12m may be configured to receive video, audio, or other types of television-related data that is transmitted from satellites orbiting the earth. As will be described further below, in one embodiment the satellite dishes 12a-12m are configured to receive DirecTV programming over KU band from 10.7 to 12.75 Gigahertz ("GHz"). In alternate embodiments, however, the satellite dishes 12a-12m may be configured to receive other types of direct broadcast satellites ("DBS") or television receive-only ("TVRO") signal, such as Dish Network signals, ExpressVu signals, StarChoice signals, and the like. In still other non-satellite based systems, the satellite dishes 12a-12m may be omitted from the system 10.

In one embodiment, a low noise-block converter ("LNC") within the satellite dishes 12a-12m receives the incoming signal from the earth-orbiting satellite and converts these incoming signals to a frequency in the L band between 950 and 2150 Megahertz ("MHz"). As will be described in further detail below with regard to FIG. 2, each of the satellites 12a-12m may be configured to receive one or more incoming satellite TV signals on a particular frequency (referred to as a transponder) and with a particular polarization and to convert these satellite signals to L band signals, each of which may contain a plurality of video or audio signals.

The satellite dishes 12a-12m may be configured to transmit the L band signals to a head-end unit or gateway server, such as the satellite gateway 14. In alternate, non-satellite embodiments, the head-end unit may be a cable television receiver, a high definition television receiver, or other video distribution system The satellite gateway 14 includes a satellite tuning, demodulating, and demultiplexing module 16 and an IP wrapper module 18. The module 16 may contain a plurality of tuners, demodulators, and demultiplexers to convert the modulated and multiplexed L band signals transmitted from the satellites 12a-12m into a plurality single program transport streams ("SPTS"), each of which carries a service (e.g., television channel video, television channel audio, program guides, and so forth). In one embodiment, the module 16 is configured to produce a single program transport stream for all of the services received by the satellite dishes 12a-12m. In an alternate embodiment, however, the module 16 may produce transport streams for only a subset of the services received by the satellite dishes 12a-12m.

The satellite tuning, demodulating, and demultiplexing module 16 may transmit the SPTS to the IP wrapper module 18. In one embodiment, the IP wrapper module 18 repackages the data within the SPTS into a plurality of internet protocol ("IP") packets suitable for transmission over the IP distribution network 20. For example, the IP wrapper module 18 may convert DirecTV protocol packets within the SPTS into IP packets. In addition, the IP wrapper module 18 may be configured to receive server requests from the STBs 22a-22n and to multicast (i.e., broadcast to one or more of the STBs 22a-22n over an IP address) the IP SPTS to those STBs 22a-22n that had requested the particular service.

In an alternative embodiment, the IP wrapper module 18 may also be configured to multicast IP protocol SPTS for services not requested by one of the STBs 22a-22n. It should be noted that the modules 16 and 18 are merely one exemplary embodiment of the satellite gateway 14. In alternate embodiments, such as the one described below in regard to FIGS. 2 and 3, the functions of the modules 16 and 18 may be redistributed or consolidated amongst a variety of suitable components or modules.

The IP distribution network 20 may include one or more routers, switches, modem, splitters, or bridges. For example, in one embodiment, the satellite gateway 14 may be coupled to a master distribution frame ("MDF") that is coupled to an intermediate distribution frame ("IDF") that is coupled to a coax to Ethernet bridge that is coupled to a router that is coupled to one or more of the STBs 22a-22n. In another embodiment, the IP distribution network 20 may be an MDF that is coupled to a Digital Subscriber Line Access Multiplexer ("DSLAM") that is coupled to a DSL modem that is coupled to a router. In yet another embodiment, the IP distribution network may include a wireless network, such as 802.11 or WiMax network. In this type of embodiment, the STBs 22a-22n may include a wireless receiver configured to receive the multicast IP packets. Those of ordinary skill in the art will appreciate that the above-described embodiments are merely exemplary. As such in alternate embodiments, a large number of suitable forms of IP distribution networks may be employed in the system 10.

The IP distribution network 20 may be coupled to one or more STBs 22a-22n. The STBs 22a-22n may be any suitable type of video, audio, and/or other data receiver capable of receiving IP packets, such as the IP SPTS, over the IP distribution network 20. It will be appreciated the term set top box ("STB"), as used herein, may encompass not only devices that sit upon televisions. Rather the STBs 22a-22n may be any device or apparatus, whether internal or external to a television, display, or computer, that can be configured to function as described herein—including, but not limited to a video components, computers, wireless telephones, or other forms video recorder. In one embodiment, the STBs 22a-22n may be a DirecTV receiver configured to receive services, such as video and/or audio, through an Ethernet port (amongst other inputs). In alternate embodiments, the STBs 22a-22n may be designed and/or configured to receive the multicast transmission over coaxial cable, twisted pair, copper wire, or through the air via a wireless standard, such as the I.E.E.E. 802.11 standard.

Figure 2:
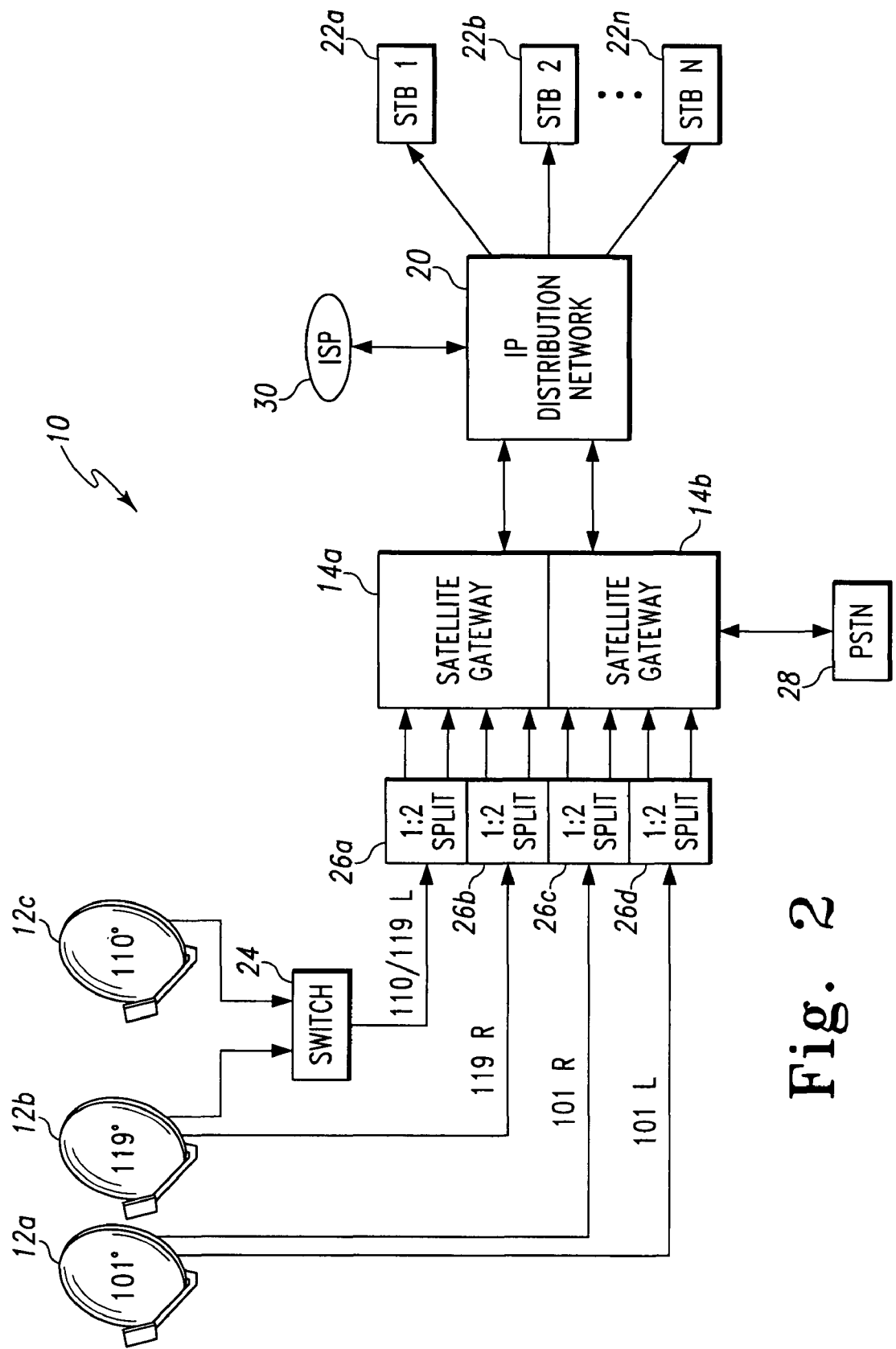
FIG. 2 is another embodiment of the exemplary satellite television over IP system illustrated in FIG. 1 of the present invention.

As discussed above, the system 10 may receive video, audio, and/or other data transmitted by satellites in space and process/convert this data for distribution over the IP distribution network 20. Accordingly, FIG. 2 is another embodiment of the exemplary satellite television over IP system 10 in accordance with one embodiment. FIG. 2 illustrates three exemplary satellite dishes 12a-12c. Each of the satellite dishes 12a-12c may be configured to receive signals from one or more of the orbiting satellites. Those of ordinary skill will appreciate that the satellites and the signals that are transmitted from the satellites are often referred to by the orbital slots in which the satellites reside. For example, in FIG. 2, the satellite dish 12a is configured to receive signals from a DirecTV satellite disposed in an orbital slot of 101 degrees. Likewise, the satellite dish 12b receives signals from a satellite disposed at 119 degrees, and the satellite dish 12c receives signals from a satellite disposed at orbital slot of 110 degrees. It will be appreciated that in alternate embodiments, the satellite dishes 12a-12c may receive signals from a plurality of other satellites disclosed in a variety of orbital slots, such as the 95 degree orbital slot. In addition, the satellite dishes 12a-12c may also be configured to receive polarized satellite signals. For example, in FIG. 2, the satellite dish 12a is configured to receive signals that are both left polarized (illustrated in the figure as "101 L") and right polarized (illustrated as "101 R").

As described above in regard to FIG. 1, the satellite dishes 12a-12c may receive satellite signals in the KU band and convert these signals into L band signals that are transmitted to the satellite gateway 14. In some embodiments, however, the L band signals produced by the satellite dishes 12a-12c may be merged into fewer signals or split into more signals prior to reaching the satellite gateway 14. For example, as illustrated in FIG. 2, L band signals from the satellite dishes 12b and 12c may be merged by a switch 24 into a single L band signal containing L band signals from both the satellite at 110 degrees and the satellite at 119 degrees.

As illustrated, the system 10 may also include a plurality of 1:2 splitters 26a, 26b, 26c, and 26d to divide the L band signals transmitted from the satellite dishes 12a-12c into two L band signals, each of which include half of the services of the pre-split L band signal. In alternate embodiments, the 1:2 splitters 26a-26b may be omitted or integrated into the satellite gateways 14a and 14b.

The newly split L band signals may be transmitted from the 1:2 splitters 26a-26d into the satellite gateways 14a and 14b. The embodiment of the system 10 illustrated in FIG. 2 includes two of the satellite gateways 14a and 14b. In alternate embodiments, however, the system 10 may include any suitable number of satellite gateways 14. For example, in one embodiment, the system may include three satellite gateways 14.

The satellite gateways 14a and 14b may then further subdivide the L band signals and then tune to one or more services on the L band signal to produce one or more SPTS that may be repackaged into IP packets and multicast over the IP distribution network 20. In addition, one or more of the satellite gateways 14a, 14b may also be coupled to a public switch telephone network ("PSTN") 28. Because the satellite gateways 14a, b are coupled to the PSTN 28, the STBs 22a-22n may be able to communicate with a satellite service provider through the IP distribution network 20 and the satellite gateways 14a, b. This functionality may advantageously eliminate the need to have each individual STBs 22a-22n coupled directly to the PSTN 28.

The IP distribution network 20 may also be coupled to an internet service provider ("ISP") 30. In one embodiment, the IP distribution network 20 may be employed to provide internet services, such as high-speed data access, to the STBs 22a-22n and/or other suitable devices (not shown) that are coupled to the IP distribution network 20.

Figure 3:
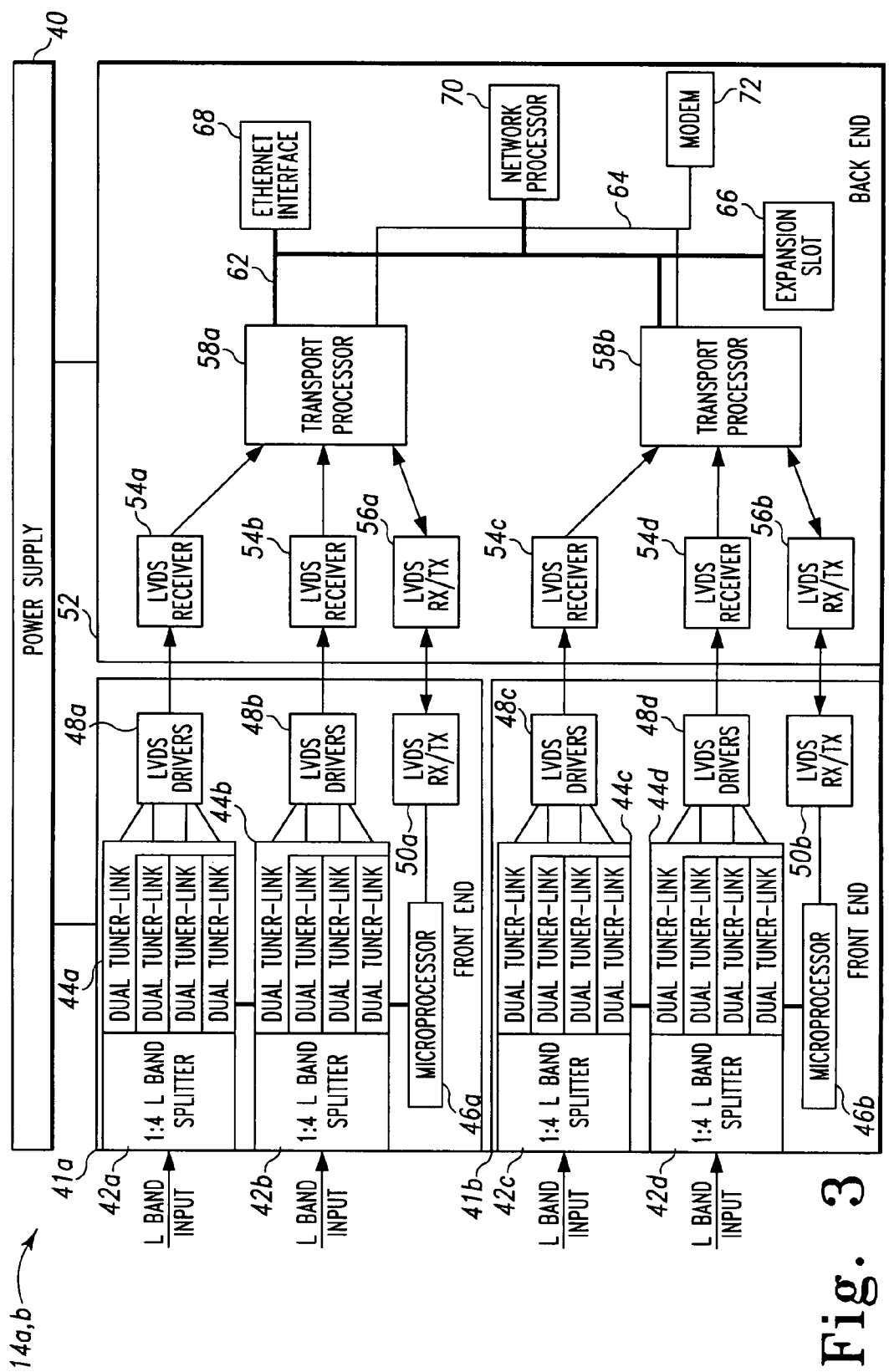
FIG. 3 is a block diagram of an exemplary satellite gateway of the present invention.

As described above, the satellite gateways 14a, b may be configured to receive the plurality of L band signals, to produce a plurality of SPTS, and to multicast requested SPTS over the IP distribution network 20. Referring now to FIG. 3, a block diagram of an exemplary satellite gateway 14 is shown. As illustrated, the satellite gateway 14a, b includes a power supply 40, two front-ends 41a and 41b and a back-end 52. The power supply 40 may be any one of a number of industry-standard AC or DC power supplies configurable to enable the front-ends 41a, b and the back-end 52 to perform the functions described below.

The satellite gateway 14a, b may also include two front-ends 41a, b. In one embodiment, each of the front-ends, 41a, b may be configured to receive two L band signal inputs from the 1:2 splitters 26a-26d that were described above in regards to FIG. 2. For example, the front-end 41a may receive two L band signals from the 1:2 splitter 26a and the front-end 41b may receive two L band signals from the 1:2 splitter 26b. In one embodiment, each of the L band inputs into the front-end 41a, b includes eight or fewer services.

The front-ends 41a, b may then further sub-divide the L band inputs using 1:4 L band splitters 42a, 42b, 42c, and 42d. Once subdivided, the L band signals may pass into four banks 44a, 44b, 44c, and 44d of dual tuner links. Each of the dual tuner links within the banks 44a-44d may be configured to tune to two services within the L band signals received by that individual dual tuner links to produce SPTS. Each of the dual tuner links may then transmit the SPTS to one of the low-voltage differential signaling ("LVDS") drivers 48a, 48b, 48c, and 48d. The LVDS drivers 48a-48d may be configured to amplify the L band transport band signals for transmission to the back-end 52. In alternate embodiments, different forms of differential drivers and/or amplifiers may be employed in place of the LVDS drivers 48a-48d. Other embodiments may employ serialization of all of the transport signals together for routing to the back end 52.

As illustrated, the front-ends 41a, b may also include microprocessors 46a and 46b. In one embodiment, the microprocessors 46a, b may control and/or relay commands to the banks 44a-44d of dual tuner links and the 1:4 L band splitters 42a-42d. The microprocessors 46a, b may comprise ST10 microprocessors produce by ST Microelectronics. The microprocessors 46a, b may be coupled to LVDS receiver and transmitter modules 50a and 50b. The LVDS receiver/transmitter modules 50a, b may facilitate communications between the microprocessors 46a, b and components on the back-end 52, as will be described further below.

Turning next to the back-end 52, the back-end 52 includes LVDS receivers 54a, 54b, 54c, and 54d, which are configured to receive transport signals transmitted by the LVDS drivers 48a-48d. The back-end 52 also includes LVDS receiver/transmitter modules 56a and 56b which are configured to communicate with the LVDS receiver/transmitter modules 50a, b.

As illustrated, the LVDS receivers 54a-54d and the LVDS receiver/transmitters 56a, b are configured to communicate with transport processors 58a and 58b. In one embodiment, the transport processors 58a, b are configured to receive the SPTS produced by the dual tuner links in the front-ends 41a, b. For example, in one embodiment, the transport processors 58a, b may be configured to produce 16 SPTS. The transport processors 58a, b may be configured to repack the SPTS into IP packets which can be multicast over the IP distribution network 20. For example, the transport processors 58a, b may repackage DirecTV protocol packets into IP protocol packets and then multicast these IP packets on an IP address to one or more of the STBs 22a-22n.

The transport processors 58a, b may also be coupled to a bus 62, such as a 32 bit, 66 MHz peripheral component interconnect ("PCI") bus. Through the bus 62, the transport processors 58a, b may communicate with a network processor 70, an Ethernet interface 84, and/or an expansion slot 66. The network processor 70 may be configured to receive requests for services from the STBs 22a-22n and to direct the transport processors 58a, b to multicast the requested services. In one embodiment, the network processor is an IXP425 network processor produced by Intel. While not illustrated, the network processor 70 may also be configured to transmit status data to a front panel of the satellite gateway 14a, b or to support debugging or monitoring of the satellite gateway 14a, b through debug ports.

As illustrated, the transport processors 58a, b may also be coupled to the Ethernet interface 68 via the bus 62. In one embodiment, the Ethernet interface 68 is a gigabit Ethernet interface that provides either a copper wire or fiber-optic interface to the IP distribution network 20. In addition, the bus 62 may also be coupled to an expansion slot, such as a PCI expansion slot to enable the upgrade or expansion of the satellite gateway 14a, b.

The transport processors 58a, b may also be coupled to a host bus 64. In one embodiment, the host bus 64 is a 16-bit data bus that connects the transport processors 58a, b to a modem 72, which may be configured to communicate over the PSTN 28, as described above. In alternate embodiments, the modem 72 may also be coupled to the bus 62.

As described above, the satellite gateway 14 may transmit IP packetized satellite services to the STBs 22a-22n over the IP distribution network 20. In one embodiment, the satellite gateway 14 may receive L band signals, convert the L band signals into transport streams containing satellite transport packets, and repacketize these transport packets into IP packets. When the IP packets arrive at the STBs 22a-22n, the STBs may decode the IP packets and reassemble the transport streams, from which the STBs 22a-22n can parse out (i.e., separate out) the satellite transport packets that can be decoded to provide the satellite service.

In one embodiment, the STBs 22a-22n may parse out the satellite transport packets by identifying one or more sync bytes within the reassembled transport stream. These sync bytes may contain sync symbols that the STBs 22a-22n are configured to recognize. Accordingly, because the sync bytes are added a preset locations within fixed length satellite transport packets, the STBs 22a-22n can parse out individual IP packets by locating the sync bytes at intervals corresponding to the fixed length of the satellite transport packet. For example, if the total length of one of the satellite transport packets is 132 bytes, one or more of the STBs 20a-20n would be able to parse the transport stream back into a plurality of individual transport packets by identifying the sync symbol reoccurring every 130 bytes within the reassembled transport stream.

One challenge, however, in parsing out transport packets from the L band transport stream is that different STBs 22a-22n may be configured to support a variety of different paring procedures. In other words, different STBs 22a-22n may employ different sync symbols and/or packet lengths. For example, one of the STBs 22a-22n may parse transport packets using a sync symbol of AA47 and a packet length of 132 bytes, another one of the STBs 22a-22n may parse packets using a sync symbol of 47 and a packet length of 130 bytes, and still another one of the STBs 22a-22n may parse packets using a sync symbol of CC47 and a packet length of 131 bytes.

FIG. 4 is a block diagram of an exemplary satellite transport packet 80 in accordance with one embodiment. The satellite transport packet 80 may include a header section 82 which contains a sync symbol for the satellite transport packet 80. The satellite transport packet 80 may also contain a payload 84, which contains the actual satellite services being transmitted. However, for a variety of reasons, the sync symbol and/or the packet length of the satellite transport packet 80 received by the satellite gateway may not match the sync symbol and/or packet length that the STBs 22a-22n are configured to recognize (hereafter referred to as the STB's "parsing procedure"). For example, one manufacturer of STBs may configure their STBs to use one parsing procedure while another manufacturer of STBs configures their STBs to using another, different parsing procedure.

To compensate for the variety of possible parsing procedures, the satellite gateway 14 may be configured to append bytes or sync symbols, as appropriate, to the satellite transport packets 80 according to the parsing procedure of the STB that will eventually parse the reassembled transport stream. Specifically, the satellite gateway 14 may append the satellite transport packet 80 to create a transport packet that complies with the parsing procedures of the STBs 22a-22.

For example, FIG. 5 is a block diagram of an exemplary appended transport packet 90 in accordance with one embodiment. For simplicity, like reference numerals have been used to designate those features previously described in reference to FIG. 4. As illustrated, the packet 90 contains the header 82 and the payload 84 (previously described with regard to FIG. 4). In addition, however, the packet 90 also includes a two byte long appended section 92 containing a new sync symbol AA47. As such, the packet 90 may now be suitable for transmission to one of the STBs 22a-22n that parses the transport stream using a sync symbol of AA47 and a packet length of 132 bytes. While not illustrated, in alternate embodiments, other suitable combinations of sync symbols and/or bytes may be added at other locations within the packet 90. For example, additional bytes may be added after the payload 84 or elsewhere within the packet 80.

As described above, the satellite gateway 14 may be configured to append the satellite transport packets 80 to comply with the parsing procedures of individual STBs 22a-22n. In one embodiment, the satellite gateway 14 maintains a list of the parsing procedures for each of the STBs 22a-22n. As such, the satellite gateway 14 may create separate multicasts, as appropriate, for each of the separate parsing procedures employed by the STBs 22a-22n that request a particular service. For example, if only one STB 22a-22n requests a particular service, that service may be modified to follow the parsing procedure supported by that single STB. If, however, two or more STBs 22a-22n that each support different parsing procedures request a particular service, the requested service may be split into two separate multicasts, each of which is appended to match the parsing procedures supported by the requesting STBs 22a-22n. In this case, the satellite gateway 14 may multicast the same satellite service (packeted differently) to the two different requesting STBs.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for processing transport packets in a gateway device, the method comprising:
   maintaining a list of parsing procedures for a plurality of set top boxes, each parsing procedure identifying a sync symbol and packet length of a transport packet recognized by a particular set top box;
   determining a parsing procedure supported by a first set top box from the list of parsing procedures;
   appending a first transport packet to comply with the parsing procedure of the first set top box;
   transmitting the first transport packet to the first set top box;
   determining a parsing procedure supported by a second set top box from the list of parsing procedures;
   appending a second transport packet to comply with the parsing procedure of the second set top box, wherein the parsing procedure of the second set top box is different from the parsing procedure of the first set top box; and
   transmitting the second transport packet to the second set top box.

2. The method of claim 1, wherein appending the first transport packet comprises adding a sync symbol to the beginning of the first transport packet.

3. The method of claim 1, wherein appending the first transport packet comprises adding one or more bytes to the beginning of the first transport packet.

4. The method of claim 3, wherein appending the first transport packet comprises adding one or more bytes to the end of the first transport packet.

5. The method of claim 1, wherein the first transport packet and the second transport packet carry a satellite service.

6. The method of claim 1, wherein transmitting the first transport packet comprises:
   repacketizing as an IP packet; and
   multicasting the repacketized first transport packet to the first set top box.

7. A head-end unit configured to:
   maintain a list of parsing procedures for a plurality of set top boxes, each parsing procedure identifying a sync symbol and packet length of a transport packet recognized by a particular set top box;
   determine a parsing procedure supported by a first set top box from the list of parsing procedures;

append a first transport packet to comply with the parsing procedure of the first set top box;

transmit the first transport packet to the first set top box;

determine a parsing procedure supported by a second set top box from the list of parsing procedures;

append a second transport packet to comply with the parsing procedure of the second set top box, wherein the parsing procedure of the second set top box is different from the parsing procedure of the first set top box; and transmit the second transport packet to the second set top box.

8. The head-end unit of claim 7, wherein the head-end unit is configured to add a sync symbol to the beginning of the first transport packet.

9. The head-end unit of claim 7, wherein the head-end unit is configured to add one or more bytes to the beginning of the first transport packet.

10. The head-end unit of claim 9, wherein the head-end unit is configured to add one or more bytes to the end of the first transport packet.

11. The head-end unit of claim 7, wherein the first transport packet and the second transport packet carry a same satellite service.

12. The head-end unit of claim 9, wherein the head-end unit is configured:

to repacketize the first transport packet as an IP packet; and to multicasting the repacketized first transport packet to the first set top box.

* * * * *